United States Patent Office 3,345,403
Patented Oct. 3, 1967

3,345,403
COMPLEX OF CALCIUM N-CYCLOHEXYL-SULFAMATE WITH GLYCINE
Alexander Galat, 126 Buckingham Road,
Yonkers, N.Y. 10701
No Drawing. Filed Aug. 20, 1964, Ser. No. 390,997
1 Claim. (Cl. 260—501)

ABSTRACT OF THE DISCLOSURE

Calcium N-cyclohexylsulfamate and glycine react in hot aqueous medium to form a complex which is precipitated, by addition of isopropanol to the reaction mixture, as a white, crystalline, non-hygroscopic solid readily soluble in water. This complex exhibits a sweet taste very similar to that of natural sugar. In addition to producing a complex that is sweet per se, the process of complex formation results in the elimination of bitter impurities formed as byproducts in the manufacture of calcium N-cyclohexylsulfamate and which ordinarily remain in this compound as marketed and consumed.

---

This invention relates to a new organic chemical compound useful as an artificial sweetening agent.

At present, one of the most widely used artificial sweetening agents is calcium N-cyclohexylsulfamate or calcium cyclamate. Although calcium N-cyclohexylsulfamate possesses a sweet taste that is acceptable to many persons, many others find it objectional and even repulsive. This situation prevails even when the compound is in a condition of highest purity.

Calcium N-cyclohexylsulfamate is also very difficult to manufacture on a large commercial scale in a highly purified condition and thus contains impurities when marketed and consumed. These impurities generally have a very unpleasant taste which they impart to the bulk of the product in which the calcium N-cyclohexylsulfamate is used. Even though the actual amount of such impurities is extremely small, the human sense of taste is sufficiently sensitive to detect their presence.

This invention relates to a new chemical compound or complex having the following structure:

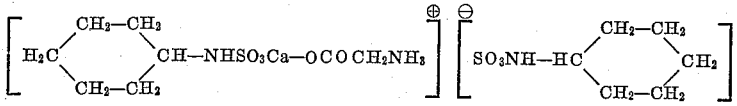

The new complex of this invention is related to calcium N-cyclohexylsulfamate and can be prepared by reacting calcium N-cyclohexylsulfamate with glycine (aminoacetic acid) in approximately equal molecular proportions.

The new complex possesses a sweet taste of a purer character and is more closely related to the taste of natural sugar than the taste of calcium N-cyclohexylsulfamate even in the pure form.

The complex formation between the calcium N-cyclohexylsulfamate and the glycine is specific and the impurities present in either reactant are eliminated from the new artificial sweetening agent by the complex formation and no significant purification problems are involved in large scale commercial production.

The reaction conditions necessary to prepare the new complex are not critical and can be varied quite widely as will be apparent to those skilled in the art.

*Example*

43.2 grams (0.1 mole) of calcium N-cyclohexylsulfamate and 7.5 grams (0.1 mole) of glycine were dissolved in 160 ml. of hot water (about 80° C.). The complex is formed almost immediately after the reactants are dissolved in the water. After formation of the complex, the solution was treated with 240 ml. of isopropanol to precipitate the complex, the solution cooled, and complex recovered by filtration. Yield: 25 gm. The complex was a white, crystalline, non-hydroscopic, solid readily soluble in water. The product had a sweet taste similar to natural sugar.

I claim:

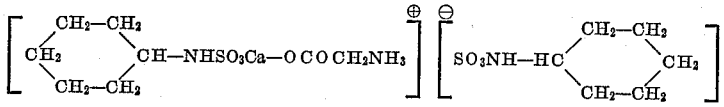

References Cited

UNITED STATES PATENTS 2,789,997   4/1957   Sahyun _____ 260—501
3,043,864   7/1962   Okuda _____ 260—500

FOREIGN PATENTS

36/9,141   6/1941   Japan.

OTHER REFERENCES

Moncrieff, Flavours 11, No. 5, 5–8, No. 6, 5–11 (1948). C.A. relied on volume 44, column 6454a.

RICHARD K. JACKSON, *Primary Examiner.*

LORRAINE A. WEINBERGER, *Examiner.*

M. WEBSTER, *Assistant Examiner.*